US011622420B2

(12) United States Patent
Knappenberger et al.

(10) Patent No.: US 11,622,420 B2
(45) Date of Patent: *Apr. 4, 2023

(54) ELECTRIC GRILL WITH CURRENT PROTECTION CIRCUITRY

(71) Applicant: Weber-Stephen Products LLC, Palatine, IL (US)

(72) Inventors: Eric Knappenberger, Chicago, IL (US); Julio C. Zuleta, Gilberts, IL (US); Matthew Lerch, Chicago, IL (US); Jeffery C. Emmerich, Delavan, WI (US)

(73) Assignee: Weber-Stephen Products LLC, Palatine, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,354

(22) Filed: Nov. 19, 2019

(65) Prior Publication Data

US 2020/0084837 A1 Mar. 12, 2020

Related U.S. Application Data

(63) Continuation of application No. 15/200,687, filed on Jul. 1, 2016, now Pat. No. 10,524,312.

(51) Int. Cl.
*H05B 3/68* (2006.01)
*H05B 1/02* (2006.01)
(Continued)

(52) U.S. Cl.
CPC ........ *H05B 1/0266* (2013.01); *A47J 37/0676* (2013.01); *A47J 37/07* (2013.01);
(Continued)

(58) Field of Classification Search
CPC .... H02H 1/0007; H02H 3/105; H02H 1/0061; H02H 3/04; H02H 3/08; H02H 3/167;
(Continued)

(56) References Cited

U.S. PATENT DOCUMENTS 3,775,591 A 11/1973 Gould, Jr.
4,634,843 A * 1/1987 Payne ................ G05D 23/1917
219/486

(Continued)

FOREIGN PATENT DOCUMENTS

CN 1508479 6/2004
CN 2847774 12/2006
(Continued)

OTHER PUBLICATIONS

Third Office Action, dated Mar. 16, 2020, in corresponding Chinese Application No. 201810415364.4.

(Continued)

*Primary Examiner* — Sang Y Paik
(74) *Attorney, Agent, or Firm* — Hanley, Flight & Zimmerman, LLC

(57) ABSTRACT

Provided is an apparatus and method for protecting against unsafe electric current conditions. A protections circuit may be used in a device, such as an electric grill, that has one or more electric loads, such as heating elements. The protection circuit may protect against various failure scenarios, including, without limitation, instances of ground fault, over current, driver failure, and failure of a microprocessor. In response to a failure, the protection circuit may trip a latch relay or disable a triac driver to stop current from flowing.

16 Claims, 7 Drawing Sheets

(51) Int. Cl.
  *A47J 37/07* (2006.01)
  *A47J 37/06* (2006.01)
  *H02H 3/16* (2006.01)
  *H02H 3/10* (2006.01)
  *H02H 3/32* (2006.01)
  *H02H 1/00* (2006.01)
  *H02H 3/08* (2006.01)
  *H02H 3/04* (2006.01)

(52) U.S. Cl.
  CPC ........ *A47J 37/0709* (2013.01); *H02H 1/0007* (2013.01); *H02H 3/08* (2013.01); *H02H 3/105* (2013.01); *H02H 3/167* (2013.01); *H02H 3/32* (2013.01); *H05B 1/0261* (2013.01); *H02H 3/04* (2013.01)

(58) Field of Classification Search
  CPC ......... H02H 3/32; H05B 1/0266; H05B 1/02; A47J 37/07; A47J 37/0709; G01R 15/202; G01R 19/165; G01R 31/025; G05D 23/00
  USPC ............................ 219/443.1–468.2, 475–519
  See application file for complete search history.

(56) References Cited

U.S. PATENT DOCUMENTS

| | | |
|---|---|---|
| 4,780,787 A | 10/1988 | Dano |
| 5,171,973 A | 12/1992 | Higgins |
| 5,280,422 A | 1/1994 | Moe et al. |
| 5,302,857 A | 4/1994 | Charles et al. |
| 5,413,032 A | 5/1995 | Bruno et al. |
| 5,524,528 A | 6/1996 | Yeh |
| 5,578,230 A | 11/1996 | Eldon |
| 5,606,245 A | 2/1997 | Kirby |
| 5,710,408 A | 1/1998 | Jones |
| 5,719,377 A | 2/1998 | Giebel et al. |
| 5,982,593 A | 11/1999 | Kimblin et al. |
| 5,986,242 A | 11/1999 | Maitani |
| 6,037,571 A | 3/2000 | Christopher |
| 6,057,997 A | 5/2000 | Mackenzie et al. |
| 6,111,230 A | 8/2000 | Cao |
| 6,118,106 A | 9/2000 | Scott |
| 6,697,244 B1 | 2/2004 | Bauer et al. |
| 6,727,475 B2 | 4/2004 | Kennard |
| 6,849,833 B2 | 2/2005 | Harrington |
| 6,927,368 B2 | 8/2005 | Cao |
| 7,131,549 B2 | 11/2006 | Hook |
| 7,312,426 B2 | 12/2007 | Han |
| 7,342,202 B2 | 3/2008 | Bachinski |
| 7,368,686 B2 | 5/2008 | Etheredge |
| 7,675,007 B2 | 3/2010 | Ashton |
| 7,825,353 B2 | 11/2010 | Shingler |
| 8,030,598 B2 | 10/2011 | Bachinski |
| 8,097,835 B2 | 1/2012 | Hsieh |
| 8,102,080 B2 | 1/2012 | Fonseca et al. |
| 8,141,478 B2 | 3/2012 | Kuo |
| 8,263,911 B2 | 9/2012 | Yen |
| 8,624,169 B1 | 1/2014 | Sorenson et al. |
| 8,680,440 B2 | 3/2014 | Cohen |
| 8,927,908 B2 | 1/2015 | Wang |
| 9,978,553 B2 | 5/2018 | Tomimbang |
| 10,524,312 B2 * | 12/2019 | Knappenberger ..... H02H 3/105 |
| 10,537,199 B2 | 1/2020 | Knappenberger et al. |
| 10,551,893 B2 | 2/2020 | Knappenberger et al. |
| 2001/0033743 A1 | 10/2001 | Kishita |
| 2003/0218846 A1 | 11/2003 | Telamo |
| 2006/0043087 A1 | 3/2006 | Gagas et al. |
| 2006/0050464 A1 | 3/2006 | Von Arx et al. |
| 2007/0116485 A1 | 5/2007 | Nishida |
| 2007/0145034 A1* | 6/2007 | Imura ................... F24C 7/082 219/494 |
| 2007/0208520 A1 | 9/2007 | Zhang |
| 2007/0262074 A1 | 11/2007 | Shearer |
| 2008/0031302 A1 | 2/2008 | Rund et al. |
| 2008/0036581 A1 | 2/2008 | Bunims |
| 2008/0136581 A1 | 6/2008 | Heilman et al. |
| 2009/0154033 A1 | 6/2009 | Tomimbang |
| 2009/0167085 A1 | 7/2009 | Fonseca et al. |
| 2010/0296217 A1 | 11/2010 | Darmann |
| 2011/0132900 A1* | 6/2011 | Kinoshita ................. F24C 7/04 219/647 |
| 2011/0160931 A1 | 6/2011 | Hsieh |
| 2011/0284518 A1 | 11/2011 | Elston et al. |
| 2013/0271886 A1* | 10/2013 | Cull ........................ H02H 3/08 361/87 |
| 2013/0334212 A1 | 12/2013 | Sawada et al. |
| 2014/0005834 A1 | 1/2014 | Hoffman |
| 2014/0242227 A1 | 8/2014 | Yang et al. |
| 2015/0312964 A1 | 10/2015 | Sorenson et al. |
| 2015/0346264 A1* | 12/2015 | Curtis .................... G01R 31/50 324/509 |
| 2016/0003484 A1 | 1/2016 | Span et al. |
| 2016/0044745 A1 | 2/2016 | Nakayama |
| 2016/0193739 A1 | 7/2016 | Vermette |
| 2016/0196739 A1 | 7/2016 | Naber et al. |
| 2016/0231721 A1 | 8/2016 | Lakshmanan |
| 2017/0020324 A1 | 1/2017 | Young et al. |
| 2018/0004271 A1 | 1/2018 | Knappenberger et al. |
| 2018/0007739 A1 | 1/2018 | Knappenberger et al. |
| 2020/0084837 A1 | 3/2020 | Knappenberger et al. |
| 2020/0100615 A1 | 4/2020 | Knappenberger et al. |
| 2020/0201414 A1 | 6/2020 | Knappenberger et al. |

FOREIGN PATENT DOCUMENTS

| | | |
|---|---|---|
| CN | 101277558 | 10/2008 |
| CN | 101577191 A | 11/2009 |
| CN | 201434433 Y | 3/2010 |
| CN | 102193443 | 9/2011 |
| CN | 202817705 U | 3/2013 |
| CN | 103142147 | 6/2013 |
| CN | 103263224 | 8/2013 |
| CN | 203167321 | 8/2013 |
| CN | 203238304 | 10/2013 |
| CN | 103416104 | 11/2013 |
| CN | 103645730 | 3/2014 |
| CN | 103926970 | 7/2014 |
| CN | 203785271 | 8/2014 |
| CN | 104065699 A | 9/2014 |
| CN | 204595584 U | 8/2015 |
| CN | 106162976 | 11/2016 |
| CN | 106211395 | 12/2016 |
| DE | 19842470 A1 | 3/2000 |
| EP | 0230246 A2 | 7/1987 |
| EP | 0258091 A1 | 3/1988 |
| EP | 0615327 A2 | 9/1994 |
| EP | 0804049 | 10/1997 |
| EP | 0906000 A2 | 3/1999 |
| EP | 2214458 | 8/2010 |
| EP | 1854719 A3 | 3/2012 |
| GB | 2067857 | 7/1981 |
| GB | 2239138 A | 6/1991 |
| GB | 2252647 A | 8/1992 |
| GB | 2329769 A | 3/1999 |
| GB | 2339348 | 1/2000 |
| GB | 2508198 | 5/2014 |
| JP | S53-050152 | 5/1978 |
| JP | S54-149042 A | 11/1979 |
| JP | S56-140422 | 7/1981 |
| JP | S57-011618 | 1/1982 |
| JP | S60-129813 A | 7/1985 |
| JP | S61-029916 | 2/1986 |
| JP | S61128033 A | 6/1986 |
| JP | S62-010513 | 1/1987 |
| JP | S62-073584 | 5/1987 |
| JP | S62-178821 | 11/1987 |
| JP | S63-049634 | 4/1988 |
| JP | S63-107412 A | 5/1988 |
| JP | H02-246769 | 10/1990 |
| JP | H03-251618 | 11/1991 |
| JP | H3-251618 A | 11/1991 |
| JP | H04-073523 | 3/1992 |

(56) References Cited

FOREIGN PATENT DOCUMENTS

| | | |
|---|---|---|
| JP | H04-073523 | 6/1992 |
| JP | H04-249088 | 9/1992 |
| JP | H04-336608 | 11/1992 |
| JP | H06-141003 | 5/1994 |
| JP | H07-078668 | 3/1995 |
| JP | H7-123504 A | 5/1995 |
| JP | H09-060888 | 3/1997 |
| JP | H9-182278 A | 7/1997 |
| JP | H09-258599 | 10/1997 |
| JP | H10-010917 | 1/1998 |
| JP | H11-018281 | 1/1999 |
| JP | H11-185953 | 7/1999 |
| JP | 2001308572 | 11/2001 |
| JP | 2002095586 | 4/2002 |
| JP | 2003014241 | 1/2003 |
| JP | 2003086347 A | 3/2003 |
| JP | 2003151759 A | 5/2003 |
| JP | 2004164431 | 6/2004 |
| JP | 2004212601 | 7/2004 |
| JP | 2005034379 A | 2/2005 |
| JP | 2005085514 | 3/2005 |
| JP | 2005195640 | 7/2005 |
| JP | 2005221086 | 8/2005 |
| JP | 2006340469 | 12/2006 |
| JP | 2008512979 A | 4/2008 |
| JP | 2008175437 | 7/2008 |
| JP | 2008180472 | 8/2008 |
| JP | 2008183763 | 8/2008 |
| JP | 2008223320 | 9/2008 |
| JP | 2008300171 | 12/2008 |
| JP | 2009510667 | 3/2009 |
| JP | 2009296802 | 12/2009 |
| JP | 2010-515976 A | 5/2010 |
| JP | 2010181044 | 8/2010 |
| JP | 2011067311 | 4/2011 |
| JP | 2011096484 | 5/2011 |
| JP | 2012242779 | 12/2012 |
| JP | 2012252851 | 12/2012 |
| JP | 2013518556 | 5/2013 |
| JP | 2014114967 | 6/2014 |
| JP | 2014190626 | 10/2014 |
| JP | 2015047389 A | 3/2015 |
| JP | 2015172447 | 10/2015 |
| JP | 2015190643 | 11/2015 |
| JP | 2016151383 | 8/2016 |
| JP | 2018007549 | 1/2018 |
| WO | 2014079493 | 5/2014 |
| WO | 2014079735 | 5/2014 |
| WO | 20150115663 | 8/2015 |
| WO | 20150138985 | 9/2015 |
| WO | 2016105551 A1 | 6/2016 |

OTHER PUBLICATIONS

Kenyon City Grill Owners Manual Mar. 28, 2011.
Meco Corp. 9300 Series Electric Barbecue Grill Owner's & Operator's Manual May 1999.
STOK Operator's Manual Electric Gridiron Grill STE1150Q Jan. 22, 2014.
Dimplex North America Ltd. Power Chef Electric Grill TBQ-120 Owner's Manual 2010.
Partial European Search Report, dated Dec. 6, 2017, in corresponding European Application No. 17179223.7.
Extended European Search Report, dated Mar. 27, 2018, in corresponding European Application No. 17179223.7.
Official Action, dated Jul. 31, 2018, in corresponding Japanese Patent Application No. 2017-128811.
Extended European Search Report, dated Sep. 12, 2018, in corresponding European Patent Application No. 18169824.2.
First Office Action and Search Report, dated Oct. 9, 2018, in corresponding Chinese Application No. 201710521319.2.
Notice of acceptance for patent application, dated Nov. 29, 2018, in corresponding Australian Application No. 2017204387.

Official Action, dated Mar. 19, 2019, in corresponding Japanese Application No. 2018-085656.
Office Action, dated Apr. 22, 2019, in corresponding Chinese Application No. 201810415364.4.
European Patent Office, "Extended European Search Report," issued in connection with European Application No. 17179224.5, dated Feb. 9, 2018, 9 pages.
Australian Patent Office, "Examination Report No. 1," issued in connection with Australian Application No. 2017204389, dated Feb. 27, 2018, 6 pages.
Chinese Patent Office, "First Office Action and Search Report," issued in connection with Chinese Application No. 201710521776.1, dated Jun. 5, 2018, 7 pages.
Japanese Patent Office, "First Office Action," issued in connection with Japanese Application No. 2017-128814, dated Jun. 5, 2018, 8 pages (English translation provided).
European Patent Office, "Extended European Search Report," issued in connection with European Application No. 18169911.7, dated Oct. 4, 2018, 10 pages.
Australian Patent Office, "Examination Report No. 1," issued in connection with Australian Application No. 2018202490, dated Oct. 2, 2018, 7 pages.
United States Patent and Trademark Office, "Non-Final Office Action," issued in connection with U.S. Appl. No. 15/200,759, dated Mar. 15, 2019, 18 pages.
Japanese Patent Office, "Office Action," issued in connection with Japanese Application No. 2018-085657, dated Jun. 25, 2019, 8 pages (English translation provided).
Japanese Patent Office, "Office Action," issued in connection with Japanese Application No. 2018-154680, dated Jun. 25, 2019, 6 pages (English translation provided).
United States Patent and Trademark Office, "Notice of Allowance," issued in connection with U.S. Appl. No. 15/200,759, dated Aug. 19, 2019, 8 pages.
Chinese Patent Office, "Office Action," issued in connection with Chinese Application No. 201810418245.4, dated Sep. 20, 2019, 20 pages (English translation provided).
United States Patent and Trademark Office, "Requirement for Restriction," issued in connection with U.S. Appl. No. 15/493,696, dated Feb. 13, 2019, 6 pages.
United States Patent and Trademark Office, "Non-Final Office Action," issued in connection with U.S. Appl. No. 15/493,696, dated May 7, 2019, 7 pages.
United States Patent and Trademark Office, "Notice of Allowance," issued in connection with U.S. Appl. No. 15/493,696, dated Sep. 24, 2019, 7 pages.
United States Patent and Trademark Office, "Supplemental Notice of Allowance," issued in connection with U.S. Appl. No. 15/493,696, dated Nov. 29, 2019, 2 pages.
United States Patent and Trademark Office, "Non-Final Office Action," issued in connection with U.S. Appl. No. 15/200,687, dated Oct. 12, 2018, 9 pages.
United States Patent and Trademark Office, "Final Office Action," issued in connection with U.S. Appl. No. 15/200,687, dated Mar. 29, 2019, 10 pages.
United States Patent and Trademark Office, "Notice of Allowance," issued in connection with U.S. Appl. No. 15/200,687, dated Aug. 19, 2019, 7 pages.
Australian Patent Office, "Examination Report No. 1," issued in connection with Australian Application No. 2019203341, dated Apr. 29, 2020, 5 pages.
Japanese Patent Office, "Notice of reason for Rejection," issued in connection with Japanese Application No. 2018-085657, dated May 12, 2020, 8 pages (English translation provided).
Chinese Patent Office, "Second Office Action," issued in connection with Chinese Application No. 201810418245.4, dated Jul. 2, 2020, 8 pages.
Australian Patent Office, "Examination Report No. 1," issued in connection with Australian Patent Application No. 2019201672, dated Jan. 14, 2020, 2 pages.
Australian Patent Office, "Notice of Acceptance," issued in connection with Australian Patent Application No. 2019201672, dated May 20, 2020, 3 pages.

(56) References Cited

OTHER PUBLICATIONS

Australian Patent Office, "Examination Report No. 1," issued in connection with Australian Patent Application No. 2020202616, dated Apr. 29, 2021, 6 pages.
Australian Patent Office, "Examination Report No. 2," issued in connection with Australian Patent Application No. 2020202616, dated Sep. 21, 2021, 3 pages.
Canadian Patent Office, "Examiner Requisition" issued in connection with Canadian Patent Application No. 2971815, dated Jul. 19, 2018, 4 pages.
Canadian Patent Office, "Examiner Requisition" issued in connection with Canadian Patent Application No. 2971815, dated Feb. 17, 2020, 3 pages.
Australian Patent Office, "Examination Report No. 1," issued in connection with Australian Patent Application No. 2018202492, dated Apr. 5, 2019, 3 pages.
Australian Patent Office, "Examination Report No. 2," issued in connection with Australian Patent Application No. 2018202492, dated Aug. 26, 2019, 2 pages.
Australian Patent Office, "Notice of Acceptance," issued in connection with Australian Patent Application No. 2018202492, dated Oct. 24, 2019, 3 pages.
Australian Patent Office, "Examination Report No. 1," issued in connection with Australian Patent Application No. 2020200829, dated Feb. 10, 2021, 7 pages.
Australian Patent Office, "Notice of Acceptance," issued in connection with Australian Patent Application No. 2020200829, dated Jun. 23, 2021, 3 pages.
Canadian Patent Office, "Office Action," issued in connection with Canadian Patent Application No. 3000527, dated Mar. 11, 2019, 3 pages.
Canadian Patent Office, "Office Action," issued in connection with Canadian Patent Application No. 3000527, dated Nov. 20, 2019, 4 pages.
Canadian Patent Office, "Office Action," issued in connection with Canadian Patent Application No. 3094309, dated Sep. 23, 2021, 4 pages.
Chinese Patent Office, "Second Office Action," issued in connection with Chinese Patent Application No. 201810415364.4, dated Sep. 20, 2019, 7 pages (English translation provided).
Chinese Patent Office, "Notification to Grant Patent Right for Invention," issued in connection with Chinese Patent Application No. 201810415364.4, dated Jul. 6, 2020, 3 pages (English translation provided).
European Patent Office, "Intention to Grant," issued in connection with European Patent Application No. 18169824.2, dated Apr. 29, 2021, 8 pages.
Japanese Patent Office, "Search Report," issued in connection with Japanese Patent Application No. 2018-085656, dated Mar. 14, 2019, 102 pages (English translation provided).
Japanese Patent Office, "Decision to Grant a Patent," issued in connection with Japanese Patent Application No. 2018-085656, dated Nov. 12, 2019, 5 pages (English translation provided).
Japanese Patent Office, "Search Report," issued in connection with Japanese Patent Application No. 2019-224437, dated Dec. 7, 2020, 72 pages (English translation provided).
Chinese Patent Office, "Second Office Action," issued in connection with Chinese Patent Application No. 201710521319.2, dated Jun. 28, 2019, 7 pages (English translation provided).
Chinese Patent Office, "Notification to Grant Patent Right for Invention," issued in connection with Chinese Patent Application No. 201710521319.2, dated Oct. 9, 2019, 3 pages (English translation provided).
Chinese Patent Office, "First Office Action," issued in connection with Chinese Patent Application No. 201911342769.0, dated May 27, 2021.
Japanese Patent Office, "Search Report," issued in connection with Japanese Patent Application No. 2017-128811, dated Jun. 11, 2018, 15 pages (English translation provided).

Japanese Patent Office, "Decision to Grant a Patent," issued in connection with Japanese Patent Application No. 2017-128811, dated Jul. 2, 2019, 5 pages (English translation provided).
Japanese Patent Office, "Search Report," issued in connection with Japanese Patent Application No. 2019-142088, dated Oct. 12, 2020, 18 pages (English translation provided).
Japanese Patent Office, "Office Action," issued in connection with Japanese Patent Application No. 2019-142088, dated Oct. 27, 2020, 11 pages (English translation provided).
Japanese Patent Office, "Office Action," issued in connection with Japanese Patent Application No. 2019-142088, dated Jun. 22, 2021, 4 pages (English translation provided).
Australian Patent Office, "Examination Report No. 2," issued in connection with Australian Patent Application No. 2017204389, dated Jun. 13, 2018, 3 pages.
Australian Patent Office, "Examination Report No. 3," issued in connection with Australian Patent Application No. 2017204389, dated Oct. 26, 2018, 4 pages.
Australian Patent Office, "Notice of Acceptance," issued in connection with Australian Patent Application No. 2017204389, dated Feb. 1, 2019, 3 pages.
Australian Patent Office, "Notice of Acceptance," issued in connection with Australian Patent Application No. 2019203341, dated Aug. 17, 2020, 3 pages.
Australian Patent Office, "Examination Report No. 1," issued in connection with Australian Patent Application No. 2020260545, dated Oct. 29, 2021, 5pages.
Canadian Patent Office, "Office Action," issued in connection with Canadian Patent Application No. 2971814, dated Jun. 19, 2018, 3 pages.
Canadian Patent Office, "Office Action," issued in connection with Canadian Patent Application No. 2971814, dated Jun. 19, 2019, 3 pages.
Canadian Patent Office, "Office Action," issued in connection with Canadian Patent Application No. 2971814, dated Sep. 3, 2020, 11 pages.
Canadian Patent Office, "Notice of Allowance," issued in connection with Canadian Patent Application No. 2971814, dated Jul. 14, 2021, 7 pages.
Australian Patent Office, "Notice of Acceptance," issued in connection with Australian Application No. 2018202490, dated Feb. 21, 2019, 3 pages.
Australian Patent Office, "Examination Report No. 1," issued in connection with Australian Patent Application No. 2019203941, dated Jun. 18, 2020, 4 pages.
Australian Patent Office, "Notice of Acceptance," issued in connection with Australian Patent Application No. 2019203941, dated Oct. 31, 2020, 3 pages.
Australian Patent Office, "Examination Report No. 1," issued in connection with Australian Patent Application No. 2021200734, dated Oct. 29, 2021, 6 pages.
Canadian Patent Office, "Notice of Allowance," issued in connection with Canadian Patent Application No. 300542, dated May 10, 2021, 6 pages.
Chinese Patent Office, "First Office Action," issued in connection with Chinese Patent Application No. 201810418245.4, dated Sep. 20, 2019, 20 pages (English translation provided).
Chinese Patent Office, "Third Office Action," issued in connection with Chinese Patent Application No. 201810418245.4, dated Mar. 1, 2021, 26 pages (English translation provided).
Chinese Patent Office, "Fourth Office Action," issued in connection with Chinese Patent Application No. 201810418245.4, dated Jun. 30, 2021, 21 pages (English translation provided).
European Patent Office, "Examination Report," issued in connection with European Patent Application No. 18169911.7, dated Dec. 4, 2020, 5 pages.
Japanese Patent Office, "Search Report," issued in connection with Japanese Patent Application No. 2018-085657, dated Jun. 19, 2019, 32 pages (English translation provided).
Japanese Patent Office, "Decision to Grant a Patent," issued in connection with Japanese Patent Application No. 2018-085657, dated Jan. 12, 2021, 5 pages (English translation provided).

(56) References Cited

OTHER PUBLICATIONS

Chinese Patent Office, "Third Office Action," issued in connection with Chinese Patent Application No. 201710521776.1, dated Sep. 18, 2019, 8 pages (English translation provided).

Chinese Patent Office, "Notification to Grant Patent Right for Invention," issued in connection with Chinese Patent Application No. 201710521776.1, dated Mar. 4, 2020, 3 pages (English translation provided).

Chinese Patent Office, "First Office Action," issued in connection with Chinese Patent Application No. 202010379486.X, dated Jul. 5, 2021, 11 pages (English translation provided).

European Patent Office, "Examination Report," issued in connection with European Patent Application No. 17179224.5, dated Oct. 23, 2020, 4 pages.

Japanese Patent Office, "Search Report," issued in connection with Japanese Patent Application No. 2017-128814, dated May 23, 2018, 59 pages (English translation provided).

Japanese Patent Office, "Decision to Grant a Patent," issued in connection with Japanese Patent Application No. 2017-128814, dated Oct. 23, 2018, 5 pages (English translation provided).

Japanese Patent Office, "Search Report," issued in connection with Japanese Patent Application No. 2018-154680, dated Jun. 19, 2019, 30 pages (English translation provided).

Japanese Patent Office, "Decision to Grant a Patent," issued in connection with Japanese Patent Application No. 2018-154680, dated Oct. 15, 2019, 5 pages (English translation provided).

Japanese Patent Office, "Office Action," issued in connection with Japanese Patent Application No. 2019-206237, dated Oct. 6, 2020, 15 pages (English translation provided).

Japanese Patent Office, "Office Action," issued in connection with Japanese Patent Application No. 2019-206237, dated Jan. 19, 2021, 6 pages (English translation provided).

Japanese Patent Office, "Decision to Grant a Patent," issued in connection with Japanese Patent Application No. 2019-206237, dated Apr. 27, 2021, 5 pages (English translation provided).

United States Patent and Trademark Office, "Non-Final Office Action," issued in connection with U.S. Appl. No. 15/493,611, dated Jul. 30, 2019, 12 pages.

United States Patent and Trademark Office, "Final Office Action", issued in connection with U.S. Appl. No. 15/493,611, dated Dec. 31, 2019, 13 pages.

United States Patent and Trademark Office, "Non-Final Office Action," issued in connection with U.S. Appl. No. 15/493,611, dated Jun. 1, 2020, 13 pages.

United States Patent and Trademark Office, "Final Office Action," issued in connection with U.S. Appl. No. 15/493,611, dated Oct. 16, 2020, 14 pages.

United States Patent and Trademark Office, "Non-Final Office Action," issued in connection with U.S. Appl. No. 15/493,611, dated Apr. 19, 2021, 14 pages.

United States Patent and Trademark Office, "Final Office Action," issued in connection with U.S. Appl. No. 15/493,611, dated Aug. 11, 2021, 14 pages.

China National Intellectual Property Administration, "First Office Action," issued in connection with Chinese Patent Application No. 202010985725.6, dated Mar. 2, 2022, 19 pages (English translation provided).

European Patent Office, "Extended European Search Report," issued in connection with European Patent Application No. 21191918.8, dated Jan. 7, 2022, 8 pages.

Japanese Patent Office, "Decision to Grant a Patent," issued in connection with Japanese Patent Application No. 2019-142088, dated Nov. 16, 2021, 4 pages.

Japanese Patent Office, "Notice of Reasons for Refusal," issued in connection with Japanese Patent Application No. 2019-224437, dated Nov. 30, 2021, 12 pages.

Australian Patent Office, "Notice of Acceptance for patent application," issued in connection with Australian Patent Application No. 2020202616, dated Dec. 1, 2021, 3 pages.

Chinese Patent Office, "Fifth Office Action," issued in connection with Chinese Patent Application No. 201810418245.4, dated Nov. 3, 2021, 7 pages.

China National Intellectual Property Administration, "Second Office Action," issued in connection with Chinese Patent Application No. 202010379486.X, dated Jan. 11, 2022, 5 pages.

China National Intellectual Property Administration, "Notification to Grant Patent Right for Invention," issued in connection with Chinese Patent Application No. 2019113427690, dated Jan. 18, 2022, 4 pages.

European Patent Office, "Examination Report," issued in connection with European Patent Application No. 18169911.7, dated Feb. 1, 2022, 6 pages.

United States Patent and Trademark Office, "Notice of Allowance," issued in connection with U.S. Appl. No. 15/493,611, dated Feb. 7, 2022, 5 pages.

European Patent Office, "Communication pursuant to Article 94(3) EPC," issued in connection with European Patent Application No. 17179223.7, dated Feb. 11, 2022, 5 pages.

United States Patent and Trademark Office, "Corrected Notice of Allowance," issued in connection with U.S. Appl. No. 15/493,611, dated Feb. 15, 2022, 2 pages.

European Patent Office, "Notice of Intention to Grant," issued in connection with European Patent Application No. 17179224.5, dated Feb. 28, 2022, 7 pages.

United States Patent and Trademark Office, "Restriction Requirement," issued in connection with U.S. Appl. No. 16/724,807, dated Mar. 9, 2022, 6 pages.

China National Intellectual Property Administration, "Decision on the Re-examination," issued in connection with Chinese Patent Application No. 201810418245.4, dated Mar. 14, 2022, 1 page.

Japanese Patent Office, "Decision to Grant a Patent," issued in connection with Japanese Patent Application No. 2019-224437, dated Mar. 7, 2022, 5 pages.

IP Australia, "Notice of acceptance," issued in connection with Australian Patent Application No. 2020260545, dated Mar. 24, 2022, 3 pages.

IP Australia, "Notice of Acceptance," issued in connection with Australian Patent Application No. 2021200734, dated Mar. 28, 2022, 3 pages.

United States Patent and Trademark Office, "Notice of Allowance and Fee(s) Due," issued in connection with U.S. Appl. No. 15/493,611, dated May 25, 2022, 5 pages.

United States Patent and Trademark Office, "Requirement for Restriction," issued in connection with U.S. Appl. No. 16/688,287, dated May 27, 2022, 5 pages.

United States Patent and Trademark Office, "Non-Final Office Action," issued in connection with U.S. Appl. No. 16/724,807, dated Jun. 24, 2022, 14 pages.

United States Patent and Trademark Office, "Corrected Notice of Allowance," issued in connection with U.S. Appl. No. 15/493,611, dated Jul. 5, 2022, 2 pages.

European Patent Office, "Decision to Grant," issued in connection with European Patent Application No. 17179224.5, dated Jul. 28, 2022, 2 pages.

United States Patent and Trademark Office, "Corrected Notice of Allowance," issued in connection with U.S. Appl. No. 15/493,611, dated Aug. 9, 2022, 2 pages.

China National Intellectual Property Administration, "Second Office Action," issued in connection with Chinese Patent Application No. 202010985725.6, dated Sep. 20, 2022, 11 pages.

European Patent Office, "Invitation pursuant to Rule 63(1) EPC," issued in connection with European Patent Application No. 22180377.8, dated Oct. 6, 2022, 3 pages.

Canadian Intellectual Property Office, "Office Action," issued in connection with Canadian Patent Application No. 3129669, dated Oct. 11, 2022, 5 pages.

Canadian Intellectual Property Office, "Notice of Allowance," issued in connection with Canadian Patent Application No. 3094309, dated Apr. 28, 2022, 1 page.

(56) References Cited

OTHER PUBLICATIONS

China National Intellectual Property Administration, "Notification to Grant Patent Right for Invention," issued in connection with Chinese Patent Application No. 202010379486.x, dated May 11, 2022, 6 pages.

China National Intellectual Property Administration, "Notification to Grant Patent Right for Invention," issued in connection with Chinese Patent Application No. 201810418245.4, dated May 19, 2022, 6 pages.

IP Australia, "Examination Report No. 1," issued in connection with Australian Patent Application No. 2021212146, dated Jun. 10, 2022, 3 pages.

Japanese Patent Office, "Decision to Grant Patent," issued in connection with Japanese Patent Application No. 2021-019730, dated Jun. 20, 2022, 4 pages (English translation included).

European Patent Office, "Extended European Search Report," issued in connection with European Patent Application No. 22180377.8, dated Jan. 25, 2023, 7 pages.

China National Intellectual Property Administration, "Third Office Action," issued in connection with Chinese Patent Application No. 202010985725.6, dated Jan. 20, 2023, 8 pages.

\* cited by examiner

ELECTRIC GRILL WITH CURRENT PROTECTION CIRCUITRY

This patent application is a continuation of U.S. patent application Ser. No. 15/200,687, filed on Jul. 1, 2016, currently pending and allowed. Its disclosure is hereby expressly incorporated, in its entirety, by reference as part of the present disclosure as if fully set forth herein.

FIELD OF THE INVENTION

The present inventions relate generally to electric grills and more particularly, to electric grills having advanced circuitry to protect against dangerous, faulty and unexpected current conditions.

BACKGROUND OF THE INVENTION

There is an increasing desire for electric grills. This is particularly true because the urban population is expanding. Many urban or other environments may not easily permit the use of traditional gas or charcoal grills. For example, many urban dwellers live in apartments or condominiums having balconies where they would like to use a grill. Because of smoke, gas or other concerns, use of typical charcoal or gas grills may not be permitted or desirable.

There are a number of available electric cooking devices, such as the George Foreman Plate Grill (and similar devices), panini presses, electric griddles and the like. However, these prior art electric cooking devices are typically intended for indoor use and are not designed or constructed for use in harsh or caustic environments where they may be degraded by high heat, weather conditions such as sun and rain, as well as fats from foods or acids from cleaning agents. These harsh conditions may cause the electrical components to degrade, which in turn may lead to electrical current leakage or other unsafe conditions.

Because prior art electric cooking devices are generally intended for indoor environments, a typical wall outlet's current protection scheme is generally sufficient for these devices. Such devices may also rely on a ground line for protection. Some prior art circuits include metal-oxide-semiconductor field-effect transistors (MOSFETs) to regulate current. Yet other prior art circuits are thermally-responsive. However, there is a need for advanced protection circuitry in an electric grill that can respond to the failure of components, including but not limited to those which cause improper current conditions, such as those that may be found in or caused by harsh environments.

For example, U.S. Pat. No. 8,263,911, entitled "Electronic Device with Heating Protection Circuit and Heating Protection Method Thereof," discloses an electronic device in which a control signal generated by a control module can assist the heating protection circuit in correctly determining whether a heating signal is failed or whether a control voltage of a control element is abnormal, and then automatically control the heating module to stop heating. The heating protection circuit uses a MOSFET coupled with a control module and a heating switch module. By contrast, some embodiments of the present invention use a combination of electro-mechanical and digital logic to detect multiple different types of failure conditions that simply cannot be detected by a MOSFET heating protection circuit.

Other prior art devices, referred to as thermally-responsive circuits, may shut down when a heating element reaches a threshold temperature. For example, U.S. Pat. No. 8,097,835, entitled "Temperature Control Circuit," discloses a temperature detecting module which detects the temperature of the electronic device for outputting a detection signal to a protection module and microprocessors. The protection module controls the status of the microprocessor. But such thermally responsive circuits are inadequate for harsh environments and current conditions which may lead to component failures. In fact, failed components may lead to current leakage, which does not always correlate with an overheated heating element. Dangerous current conditions may occur even if a heating element is within normal temperatures.

Thus, there is a need for an electric grill, including a grill with one or more independently controlled heating elements, having protection circuitry that protects against, among others things, short circuits, overcurrent, driver failure and/or microcontroller failure.

BRIEF SUMMARY OF THE INVENTIONS

The present inventions overcome many of the deficiencies of known electric cooking devices and provide new features and advantages for electric grills. For example, the present invention provides protection circuitry that shuts off power to the heating element or elements in the case of faulty, unexpected and/or dangerous current conditions.

The present inventions generally provide an electric grill with circuitry and a microprocessor configured to protect against unsafe electric current conditions. Embodiments of the invention include one or more electric heating elements connected to a voltage through one or more latch relays. Each latch relay is an electro-mechanical switch controlled by a trip controller and a ground fault detection unit, which creates an open circuit if an unsafe current condition is detected. Each heating element is driven by a triac, which in turn is connected to a triac driver controlled by a microprocessor. The microprocessor receives current readings from a Hall Effect sensor and is configured to create an open circuit by disabling the triacs when an unsafe current condition is detected. A watchdog monitor is optionally included to disable the triacs if the microprocessor enters a non-normal state of operation.

In accordance with a preferred embodiment of the present invention, a protection circuit for use in an electric grill is provided. Included is a first and second heating element connected to a voltage line through a first and second triac, which is in turn connected to a neutral line. At least one latch connected between the heating elements and the voltage line, the latch being connected to a trip controller through a control line is also provided. Further, a current transformer configured to measure a difference in current between the voltage line and the neutral line and connected through the control line to a ground fault detection unit; and, a control line connecting the ground fault detection unit and the trip controller may be provided. Also provided is a microprocessor connected to a first triac driver and a second triac driver; the first and second triac drivers being respectively connected to the first and second triacs.

In a preferred example, the circuit of the present invention also includes at least one Hall Effect sensor connected to measure current in the voltage line, the Hall Effect sensor being in communication with the microprocessor. In addition, the microprocessor may also be configured to disable at least one triac driver if a current reading from a Hall Effect sensor exceeds a predetermined current threshold.

A preferred protection circuit may also include a watchdog monitor connected to the microprocessor and to the first and second triacs and/or a first and second thermocouple proximately located at the first and second heating element respectively and which is in communication with the microprocessor. The microprocessor is further configured to receive a current reading from the Hall Effect sensor and compare said current reading to an expected current. One or more control knobs are provided.

The present inventions also provide methods for protecting an electric circuit, having the steps of delivering current to at least one electric heating element connected to a voltage line and a neutral line through a triac and a latch relay; using a current transformer to measure a current difference between the voltage line and the neutral line; and generating an electric signal indicating the current difference and responding to said current difference by activating a trip controller connected to the latch relay.

A preferred method may also include the steps of using a Hall Effect sensor to measure a current passing through the triac; sending a signal indicative of the current passing through the triac to a microprocessor and, using the microprocessor to compare the current passing through the triac to a predetermined current threshold. A preferred method may also include the step of responding to a current passing through the triac that exceeds a predetermined current threshold by disabling the flow of electricity to the one or more electric heating elements.

Still further, the methods may include the step of selecting the predetermined current threshold in response to an operating mode received through a user input and/or the steps of sending a signal indicative of normal operation from the microprocessor to a watchdog monitor; and, sending an enable signal from the watchdog monitor to said triac in response to the signal indicative of normal operation.

The present inventions also provide for an electric grill having a housing with at least two user inputs and a display, an electric cord connected to a voltage line and a neutral line, at least two heating elements respectively connected to a first and second triac and further connected to the voltage line and neutral line; and, a microprocessor connected to a first and second triac driver, the first and second triac drivers respectively in communication with the first and second triac; and a Hall Effect sensor connected to measure the current passing through the triacs, said Hall Effect sensor being in communication with the microprocessor.

In addition, a current transformer configured to measure a current difference between the voltage line and the neutral line, said current transformer in communication with a ground fault detection unit; and a trip controller in communication with the ground fault detection unit, and further in communication with at least one latch connected between the first and second triac and the voltage line may also be provided.

In yet another embodiment of the present inventions, an electric grill is provided, including a housing having on or more user inputs, an electric cord connected to a voltage line and a neutral line, at least one heating element connected to a triac and further connected to the voltage line and neutral line, at least one latch relay connected between the heating element and the voltage line, the latch relay being in communication with a trip controller, a ground fault detection unit in communication with the trip controller and configured to activate the trip controller in response to an unbalanced current between the voltage line and the neutral line, a microprocessor connected to a triac driver, the triac driver being in communication with the triac, and a current sensor configured to measure current passing through the triac, the current sensor being in communication with the microprocessor. The microprocessor may be configured to receive a current reading from the current sensor and compare the current reading to an expected current and to disable a triac in response to a difference between the current reading and the expected current.

Accordingly, it is an object of the present inventions to provide a protection circuit for use in an electric grill to detect and prevent short circuits, overcurrent, driver failure, microcontroller failure and/or other unexpected or undesirable current conditions.

Another object of the present inventions is to provide a protection circuit that allows an electric grill to remain in an outdoor environment for prolonged periods of time without creating dangerous electric conditions and/or which protects the components of the grill.

An additional object of the present inventions is to provide an electric grill that can safely be used in outdoor or harsh environments.

A further object of the present inventions is to provide a protection circuit that detects current leakage and responds by disabling the flow of current.

A further object of the present inventions is to provide a protection circuit that detects a ground fault and responds by disabling the flow of current.

A further object of the present inventions is to provide a protection circuit that detects an unbalanced current and responds by disability the flow of current.

Still another object of the present inventions is to provide a protection circuit that detects an overcurrent and responds by disabling the flow of current.

Still an additional object of the present inventions is to provide a protection circuit that detects an current draw that differs from an expected current draw and responds by disabling the flow of current.

Still yet a further object of the present inventions is to provide a protection circuit that includes a microprocessor and can detect when the microprocessor enters an abnormal state of operation.

And yet another object of the present inventions is to disable current flowing through an electric grill when an unsafe operating condition or failure scenario is detected.

And still yet another object of the present inventions is to provide a protection circuit that may be used on an electric grill or other devices, for indoor and/or outdoor use, to protect against unwanted, unsafe and/or unexpected current conditions.

Inventors' Definition of Terms

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features, objects and advantages of the present invention (sometimes used in the singular, but not excluding the plural) will become apparent from the following description and drawings, wherein the like reference numerals represent like elements in the various views and in which.

DETAILED DESCRIPTION OF THE PREFERRED EMBODIMENTS

Figure 1A:
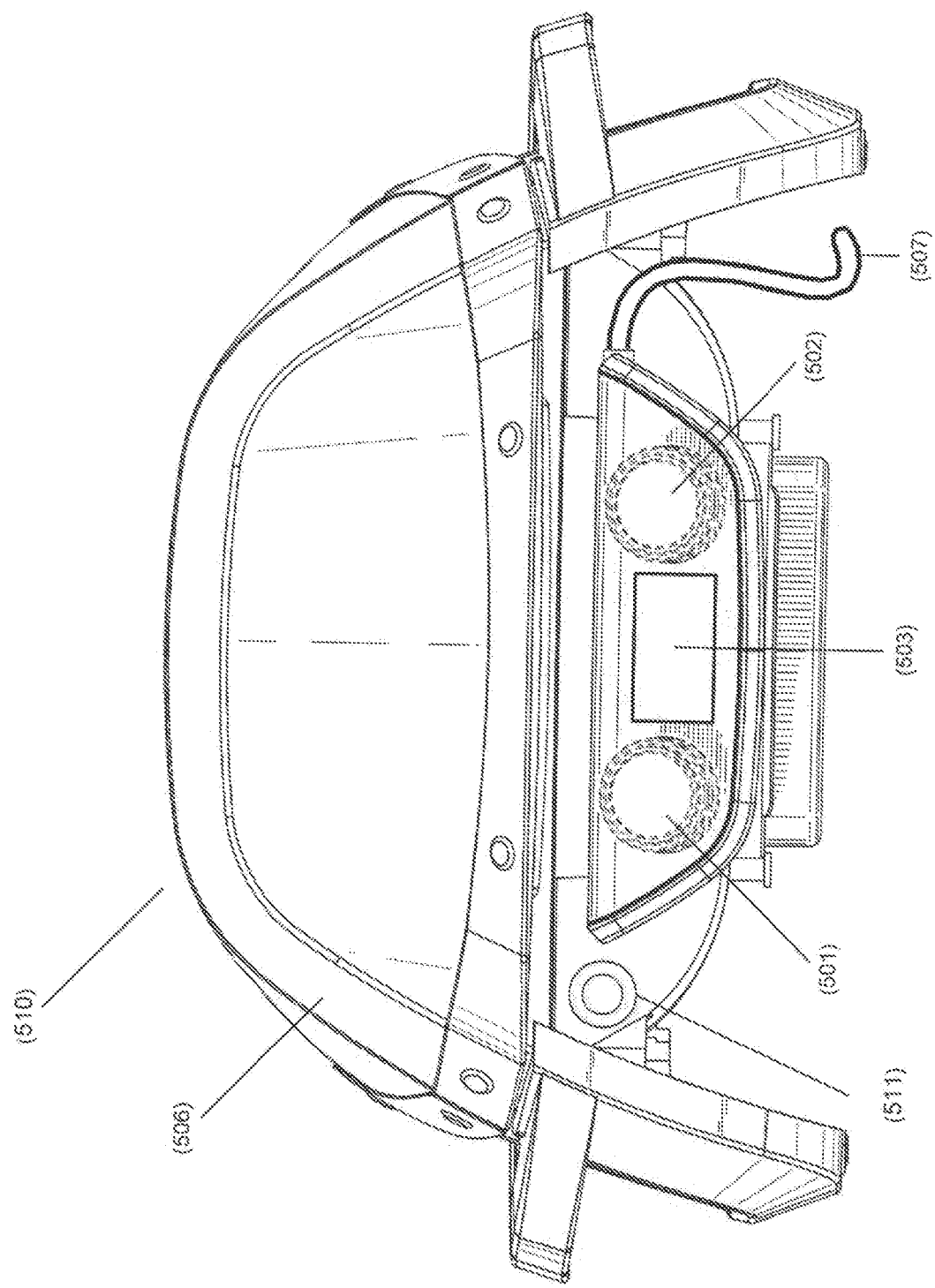
FIG. 1A is a front view of an exemplary electric grill of the present invention.

Set forth below is a description of what is currently believed to be the preferred embodiments or best representative examples of the inventions claimed. Future and present representative or modifications to the embodiments and preferred embodiments are contemplated. Any alterations or modifications which make insubstantial changes in function, purpose, structure or result are intended to be covered by the claims of this patent. The present inventions may be used on and/or part of electric grills with a digital power supply as discussed in the co-pending patent application entitled "Digital Power Supply" filed by Applicants on the same day as this application and assigned to Weber-Stephen Products LLC, and which is incorporated herein by reference in its entirety.

The use of electric heating elements 103, 104 in harsh or outdoor environments creates a need for protection circuitry 100 that protects against dangerous current scenarios resulting from the potential failure or misuse of components in an electric grill 510. The environmental conditions—including sun, rain, wind, cleaning agents, food stuffs, and the like—may degrade electrical components and lead to short circuits, leaking current, or other dangerous conditions. In some instances, components may be permanently degraded. In other instances degraded components, such as heating elements 103, 104, may return to normal condition if they are cleaned or re-installed. In both instances, there is a need to restrict the flow of current to protect the user.

Protection circuitry 100 may protect against various failure scenarios, including, without limitation, instances of ground fault; overcurrent; driver failure; and failure of the microprocessor 113. For example, a ground fault (or unbalanced current) occurs when the current drawn by a device such as electric grill 510 does not match the current returned by the device to the wall outlet. Often times, this indicates a current leakage. Leaking current creates a hazard to a user, especially if the current reaches the electric grill's housing 506. In that case, the user may be shocked. In another failure scenario, degraded components may cause the electric grill 510 to draw an unsafe current load, leading to a so-called "overcurrent." That may result in component damage and eventually lead to leaking current. In yet another failure scenario, a heating element 103, 104 may receive a current load that is not necessarily unsafe, but is inconsistent with the heating element's operating mode. This inconsistency suggests a driver failure, which in turn may lead to unsafe conditions. A further failure scenario involves the failure of the microprocessor 113. Because the microprocessor 113 controls the current delivered to the heating element(s), its failure could potentially lead to unpredictable current loads. Aspects of the present invention are designed to disable current in the event one or more failure scenarios (including those identified above) are recognized.

FIGS. 1-6 show preferred embodiments of an electric grill 510 and a preferred protection circuitry 100. By way of example, FIGS. 1A and 1B show a representative electric grill and some of its major components. FIG. 1A shows a preferred exterior of electric grill 510, including a housing and lid 506, onto which left and right control knobs 501 and 502, as well as display 503, may be mounted. The electric grill 510 includes a power cord 507 for connecting to an AC wall outlet. Left and right control knobs 501 and 502, and display 503, connect to a microcontroller 113 which is described in greater detail herein. A reset button 511 may also be provided for use as hereinafter described.

Figure 1B:
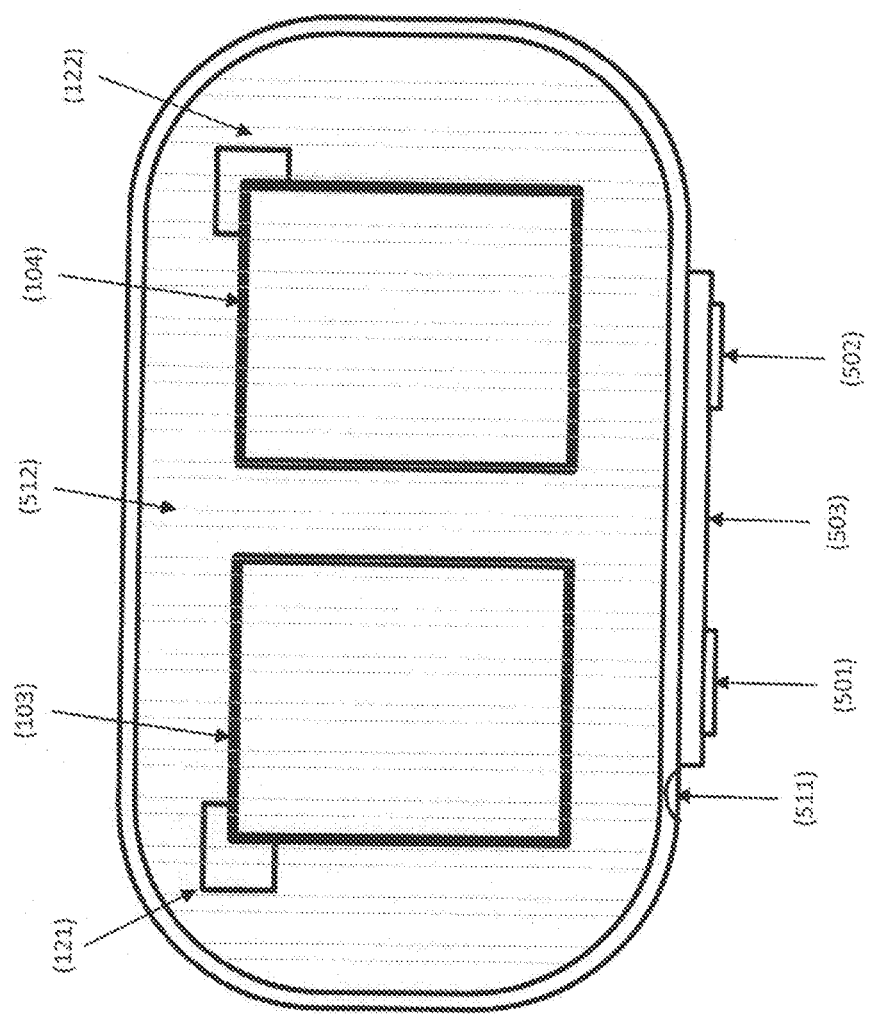
FIG. 1B is a top schematic view through a typical cooking surface of a representative electric grill of the present invention showing internal components.

As shown in FIG. 1B, left and right control knobs 501 and 502 may be associated with a first and second heating element, 103 and 104, respectively, thus creating dual cooking zones. A representative grate or cooking surface 512 is also shown in FIG. 1B. Each heating element 103, 104 may be controlled independently by a knob 501, 502 or other controller or user input associated with the heating element 103, 104. Left knob 501 and right knob 502 may be positioned on the exterior of a grill housing 506. The knobs 501 and 502, or any other input device that will be understood by those of skill in the art, may be connected to a microprocessor 113 to set the operating mode of one or more heating elements 103, 104. Although FIGS. 1A and 1B shows two knobs 501, 502 controlling two heating elements 103, 104, it should be understood that protection circuitry 100 may be used with any combination of user input devices and heating elements, as will be understood by those of skill in the art.

Using knobs 501 and 502, or any other input device, a user typically selects an operating mode for one or both heating elements 103 and 104. The operating mode may include a desired temperature setting. Microprocessor 113, described in further detail herein, controls the electric current delivered to heating elements 103 and 104 in order to achieve the desired temperature setting. Microprocessor 113 can achieve a desired temperature for each heating element 103 and 104 using a feedback loop in which it receives a current or real time temperature reading from thermocouples 121 and 122, which are proximally positioned by respective heating elements 103 and 104. A person of ordinary skill in the art would recognize that various types and numbers of knobs, touch-pad, heating elements, temperature sensors and/or displays may be used.

The electric grill 510 preferably includes a display 503 and/or other user interface. The display 503 may be connected to microprocessor 113 and display information relating to the current settings or operation of one or more of the heating elements 103, 104. For example, the display 503 may show the current temperature of heating elements 103 and 104 (as measured by thermocouples 121 and 122), as well as the desired temperature a user has selected via knobs 501 and/or 502.

Figure 2:
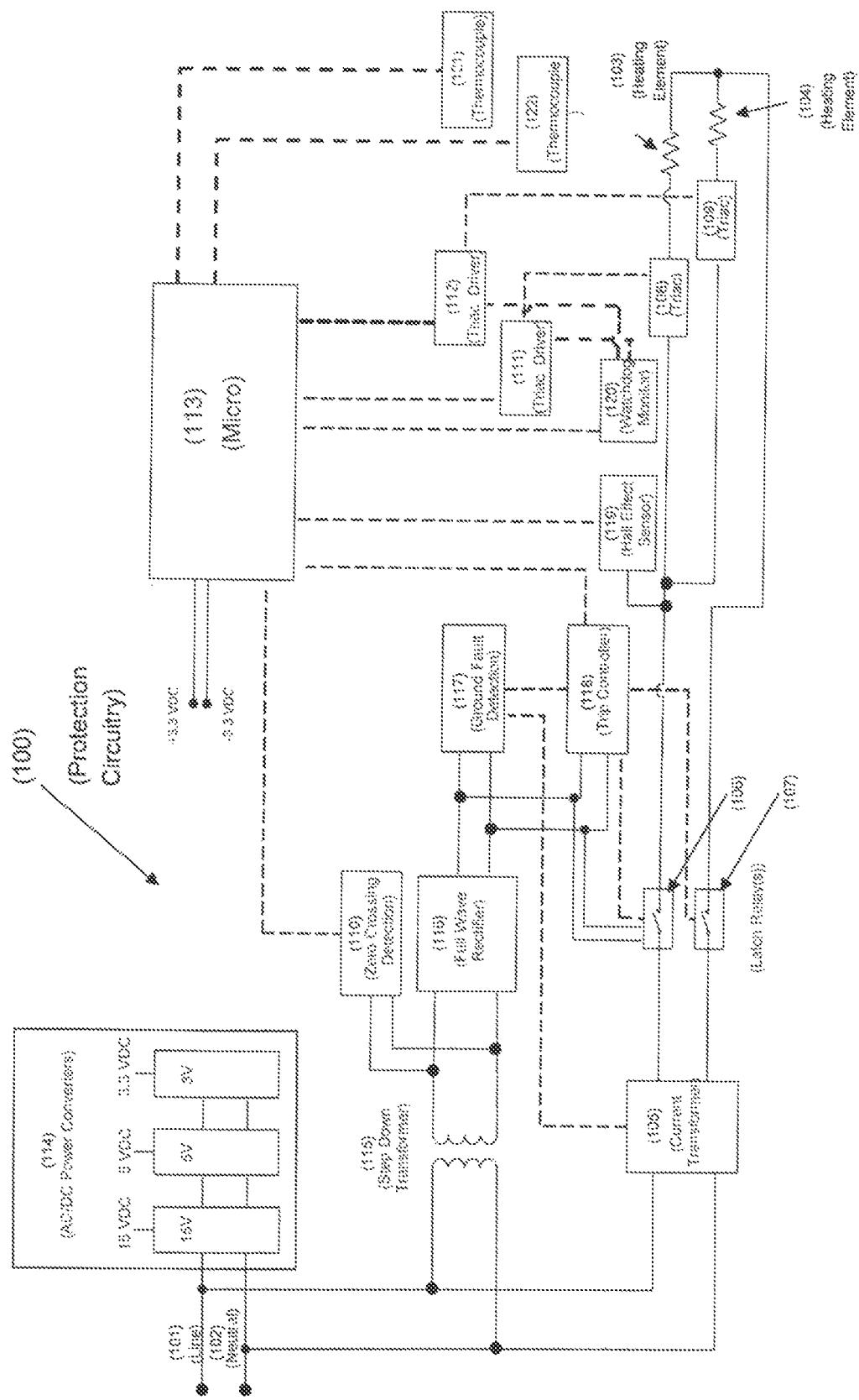
FIG. 2 is a schematic of a preferred embodiment of a protection circuit of the present invention.

A preferred embodiment of protection circuitry 100 is shown in FIG. 2, where perforated lines represent control/data lines while solid lines represent power lines. In general, non-limiting terms, FIG. 2 shows hardware components and a specially configured microprocessor that can detect various failure conditions and respond by disabling the flow of current to the electric grill 510. Protection circuitry 100 includes a current transformer 105 for measuring a potential difference, if any, between current drawn by the device and current returned from the device. A ground fault detection unit 117 is provided to evaluate the difference, if any, and activate a trip controller 118, which would cause a latch relay 106 and/or 107 to create an open circuit and thus stop the flow of current. Moreover, a microprocessor 113 receives current readings from a Hall Effect sensor 119 and may use those current readings to detect various types of dangerous conditions. If a dangerous condition is detected, microprocessor 113 may activate the trip controller 118 to create an open circuit, or disable triac drivers 111 and/or 112 in order to prevent current from flowing to heating elements 103 and/or 104. A watchdog monitor may optionally be provided to communicate with microprocessor 113 and to disable triacs 108 and/or 109 in the event microprocessor 113 is not communicating normally.

Line 101 and neutral 102 may draw alternating current (AC) from a typical wall outlet. A traditional power cord 507 may be used to plug line 101 and neutral 102 into an AC wall outlet using typical fixtures. Line 101 and neutral 102 also connect to a set of one or more AC/DC power converters 114 which supply the basic power needs of various components including display(s) and/or microprocessor(s). The power converters 114 convert the alternating current to direct current having lines of 3.3 Volts DC, 5 Volts DC, and 15 Volts DC. These DC lines may be used to power various components on the electric grill, such as one or more displays, microprocessor(s), etc. A person of ordinary skill would recognize that the AC/DC power converters 114 can be used to supply any level of DC voltage required by any of the electric grill's components.

Line 101 and neutral 102 further connect to current transformer 105, which measures the difference, if any, between current going to heating elements 103 and/or 104 from line 101, and current returning to neutral 102. A potential difference in current, if any, is signaled to ground fault detection unit 117, which evaluates the difference in current to determine if current is leaking. In other words, if damage to the circuit (whether temporary or permanent) has caused electric current to leak from any of the components, then the current returning through neutral 102 will be less than the current drawn in line 101. Ground fault detection unit 117 detects that there is electric current missing. Missing current is indicative of a dangerous operating condition because it may come in contact with the user, causing an electric shock, or cause other components to fail.

In such a scenario, a desired response is to stop the flow of any current in order to avoid the risk of shock, electrocution or component damage. To cause current to stop flowing, ground fault detection unit 117 activates a trip controller 118, which in turn opens electro-mechanical latches 106 and 107. As shown in FIG. 2, latches 106 and 107 are positioned in series with heating elements 103 and 104; thus, tripping a latch causes an open circuit, which, by definition, stops the flow of current. Latch relays 106 and 107 may be electro-mechanical switches for creating an open circuit and may be connected via a control line to trip controller 118. When tripped, latch relays 106 and 107 may remain open until a user engages a mechanical switch. As one example, a reset button 511 or other mechanical switch on the housing 506 may be associated with the latch relays 106 and 107 to reset them into a closed position after they have been tripped.

Figure 4:
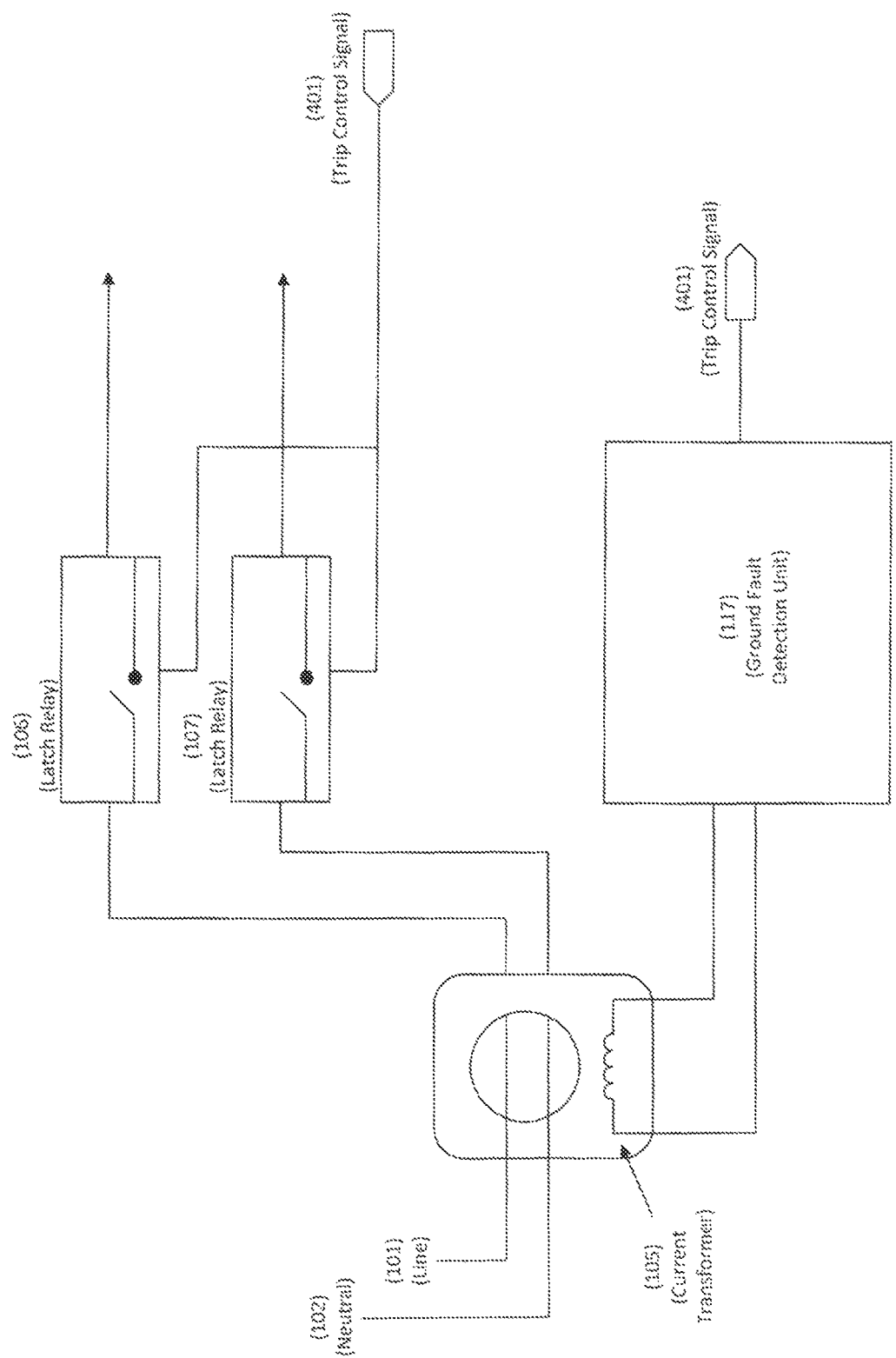
FIG. 4 is an exemplary schematic showing an isolated view of a current transformer used to generate a trip control signal of the present invention.

An exemplary embodiment of ground fault detection unit 117 interacting with latch relays 106 and 107 is best shown in FIG. 4. As a non-limiting example, ground fault detection unit 117 may be a ground fault interrupter such as part number FAN4146ESX, made by Fairchild Semiconductor. The current transformer 105 is positioned to measure the current difference, which is read by ground fault detection unit 117. Ground fault detection unit 117 generates a trip control signal 401 if the current difference exceeds a safety threshold, in which case trip control signal 401 is fed back to latch relays 106 and 107, creating an open circuit and stopping the flow of current. A user turning on a device in which current is leaking will be protected because the tripping of latch relays 106 and 107 will cause an open circuit, thereby minimizing the risk of electric shock to the user or further damage to the equipment. A person of skill in the art would recognize that a certain tolerance in current difference may be allowable.

Again by reference to FIG. 2, a step-down transformer 115 is provided because ground fault detection unit 117 operates at a lower voltage than that drawn from line 101 and neutral 102. Line 101 and neutral 102 are connected to step-down transformer 115, which provides a lower secondary voltage through a full wave rectifier 116 to ground fault detection unit 117 and also to a trip controller 118. The step down transformer 115 has the benefit of isolating the ground fault detection unit 117 and trip controller 118 from the high voltage of line 101 and neutral 102. Instead, they operate at the lower secondary voltage. A person of skill in the art would recognize that step-down transformers are used to isolate components operating at a lower voltage. Step down transformer 115 has the additional benefit of separating ground fault detection unit 117 from microprocessor 113, which provides added protection in the event that microprocessor 113 fails during a ground fault/unbalanced current. Microprocessor 113's failure would not prevent ground fault detection unit 117 from recognizing a ground fault/unbalanced current. Likewise, a failure of ground fault detection unit 117 would not prevent microprocessor 113 from continuing to monitor current conditions.

During normal operation, microprocessor 113 controls the heat and temperature setting by controlling the flow of electricity to heating elements 103 and 104. Microprocessor 113 may also be configured to detect and respond to abnormal operating conditions, i.e. conditions having an increased risk of electrocution, shock or component damage. A discussion of microprocessor 113's functionality during normal operating conditions is provided, followed by specific configurations that allow microprocessor 113 to detect and respond to failure conditions.

During normal operating conditions, microprocessor 113 controls the electricity (and thus, the heat and temperature) to heating elements 103 and 104 from line 101 and neutral 102. The electric path runs through line 101 and neutral 102, which are connected through current transformer 105, and further through a series of latch relays 106 and 107 and triacs 108 and 109. As will be understood, triacs are three electrode devices, or triodes, that conduct alternating current. Triacs are a type of solid state bidirectional switch. The protection circuit 100 disclosed herein describes the use of triacs to control current flowing to heating elements 103 and 104, however it will be understood that other solid state bidirectional switches may be used in place of a triacs consistent with the present inventions. Heating elements 103 and 104 may be resistive heaters which increase in temperature as more current passes through them. Other types of heating elements 103, 104 may also be used as will be understood by those of skill in the art.

Triac drivers 111 and 112 control triacs 108 and 109 by "opening" and "closing" them to allow or prevent current from passing to heating elements 103 and 104. A person of ordinary skill in the art would recognize that triac drivers are used to control a high voltage triac with a low voltage DC source (such as a microprocessor) (FIG. 2). Moreover, triac drivers 111, 112 are used to isolate devices from a potentially high current or voltage in a triac. Triac drivers 111 and 112 interface between microprocessor 113 and triacs 108 and 109 while at the same time keeping microprocessor 113 isolated from voltages and currents in triacs 108 and 109.

In order to achieve a user's desired temperature during normal operation, microprocessor 113 controls current delivered to the heating elements 103 and 104 by activating (or deactivating) triacs 108 and 109 via their triac drivers 111, 112. In other words, microprocessor 113 controls the current drawn, and thus the temperature, of heating elements 103 and 104 by controlling the triac drivers 111 and 112. A disabled triac 108 and/or 109 creates an open circuit through which no current can flow.

In order to recognize when a desired temperature has been achieved, microprocessor 113 may receive temperature feedback from one or more thermocouples 121 and 122 located proximately to each heating element 103 and 104. FIG. 1B shows a representative example of thermocouples 121 and 122 adjacent to each heating element 103 and 104. The feedback is used by microprocessor 113 to adjust the current delivered to the heating elements 103, 104 until the desired temperatures selected by knobs 501 and/or 502 is achieved. As a result, a user can select a desired operating mode (independently) for heating elements 103 and 104 and microprocessor 113 will control the current delivered until a desired temperature setting is reached.

Figure 5:
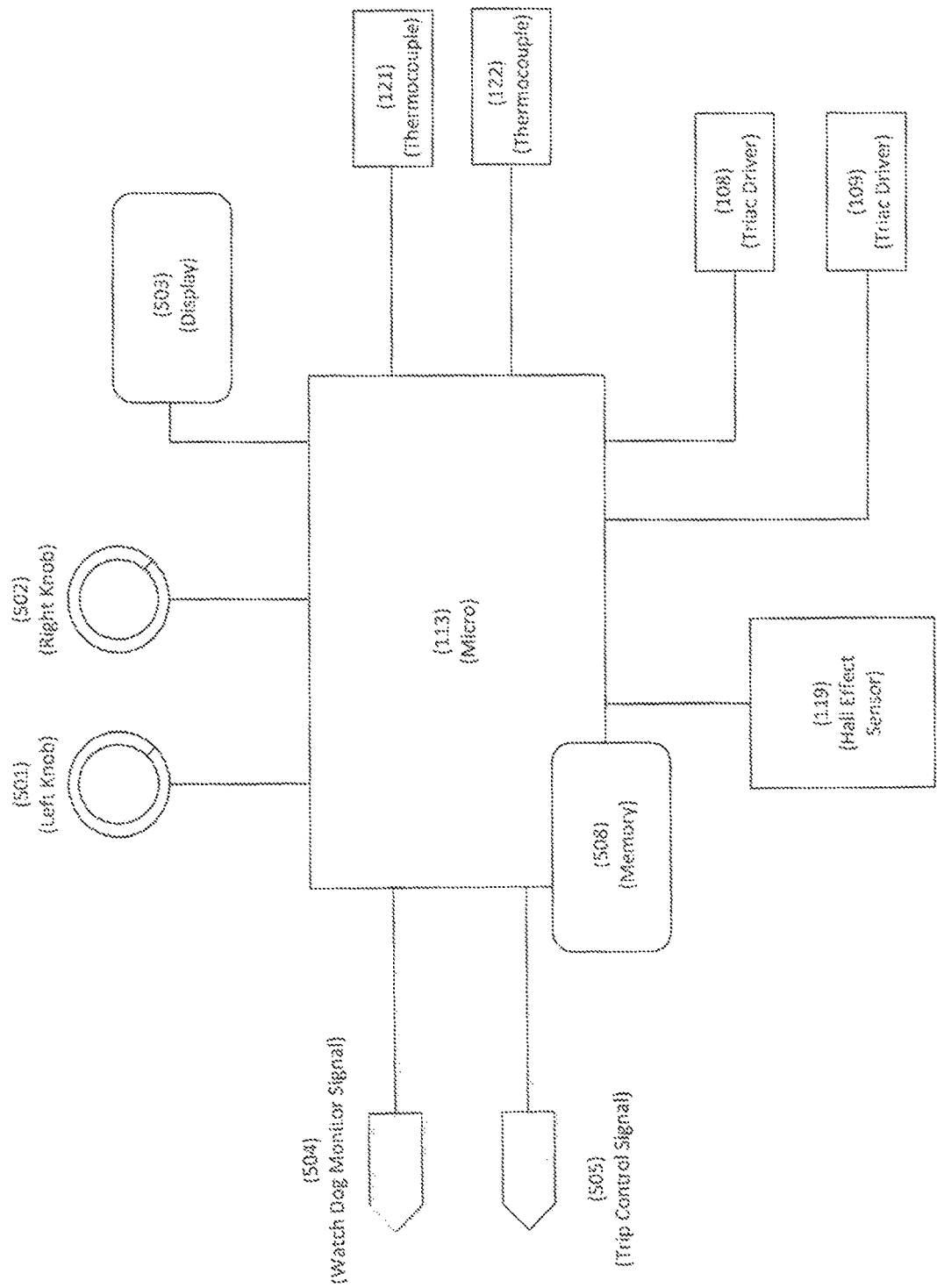
FIG. 5 is an isolated diagram of a microprocessor and exemplary inputs and outputs that may connect to the microprocessor of the present invention.

FIG. 5 shows exemplary inputs and outputs to and from microprocessor 113, which can use the feedback from the thermocouple 121 and/or 122 to adjust current flowing to a heating element 103 and/or 104 until a desired temperature is reached. The desired temperature may be selected by a user through a user interface, such as knobs 501 or 502, and communicated electronically to microprocessor 113. A person of ordinary skill in the art would know understand that the microprocessor 113 may include and communicate with an internal or external memory 508 containing the software instructions for executing the calculations and comparisons, as well as other settings described herein.

As an optional input example, microprocessor 113 may receive a control signal from a zero crossing detection unit 110 (FIG. 2). The zero crossing detection unit 110 sends a control signal each time the alternating current, as measured through step down transformer 115, crosses zero. Using this signal, microprocessor 113 can identify the present status of an alternating current's wave form. Tracking the zero crossings enables microprocessor 113 to turn triacs 108 and 109 on and off in a manner that reduces the harmonics introduced.

Figure 3:
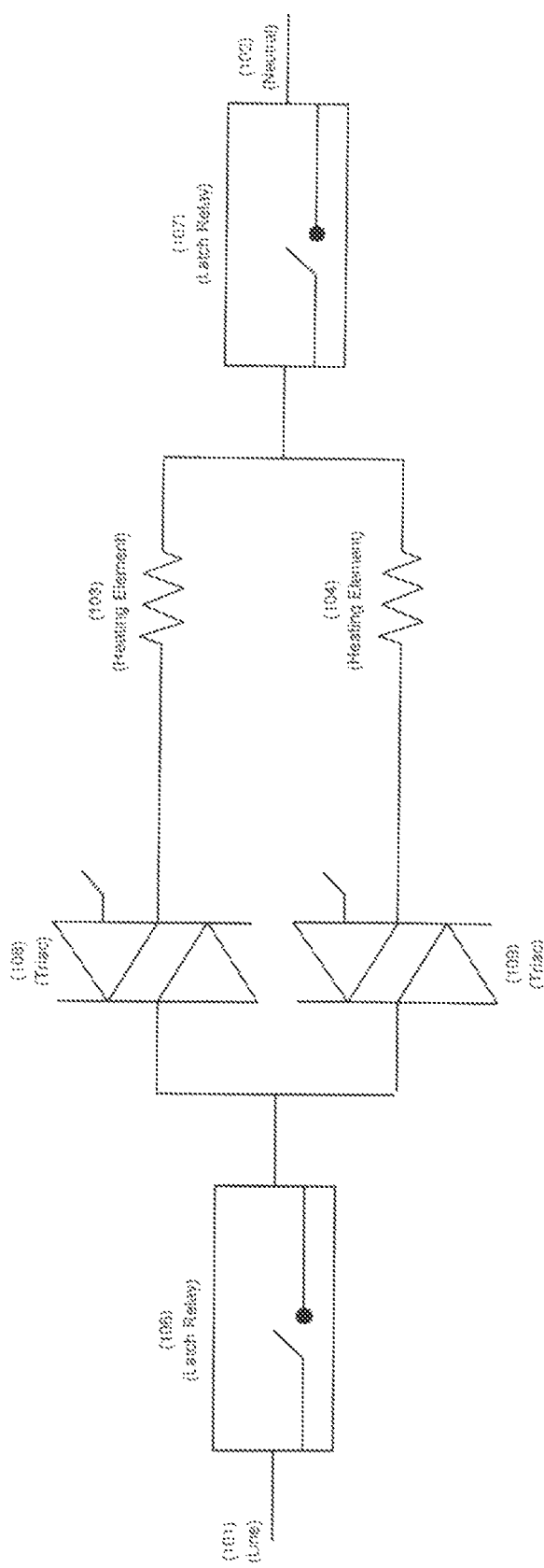
FIG. 3 is an exemplary schematic showing an isolated view of one or more heating elements driven by one or more triacs of the present invention.

Microprocessor 113 may be configured to identify dangerous conditions that arise during normal operation. Although ground fault detection unit 117 detects a leaking current, there are other dangerous conditions that microprocessor 113 is specifically configured to detect and respond to. As seen in FIG. 2, microprocessor 113 is in communication with trip controller 118 and triac drivers 111 and 112, thus giving microprocessor 113 two different ways to stop a flow of current—by tripping a latch 106 or 107, or by disable triacs 108 and/or 109 if it detects a failure condition. For example, FIG. 3 shows that heating elements 103 and 104 are in series with triacs 108, 109 and with latches 106, 107. As a practical matter, opening one of the latches 106, 107 or both of the triacs 108, 109 will stop the flow of all current.

As one example, microprocessor 113 may be configured to respond to an "overcurrent" scenario. Overcurrent conditions are dangerous because they are associated with an increased risk of component failure and/or damage to electronic circuitry, which in turn may be a precursor to current leakage. An overcurrent scenario occurs when a circuit draws more current than it is safely rated to handle. An overcurrent may occur if a harsh environment causes the resistance value of some components, such as heating elements, to change, resulting in a higher current draw. However, an overcurrent scenario does not necessarily correlate to a mismatch in current. Therefore, ground fault detection unit 117 may not detect an overcurrent and it may be desirable to configure microprocessor 113 to recognize it. To that end, a Hall Effect Sensor 119 sends microprocessor 113 a current reading indicative of the current flowing through triacs 108 and 109. A Hall Effect sensor 119 measures the current being delivered through one or more of the triacs and to heating elements 103 and 104. The protection circuitry described herein discloses a Hall Effect sensor 119 that is used to measure current, but a person of skill in the art would recognize that any suitable current sensor may be used in place of Hall Effect sensor 119. The Hall Effect sensor 119 is connected to microprocessor 113 via a control line to convey to microprocessor 113 how much current is being delivered through the heaters 103, 104.

Figure 6:
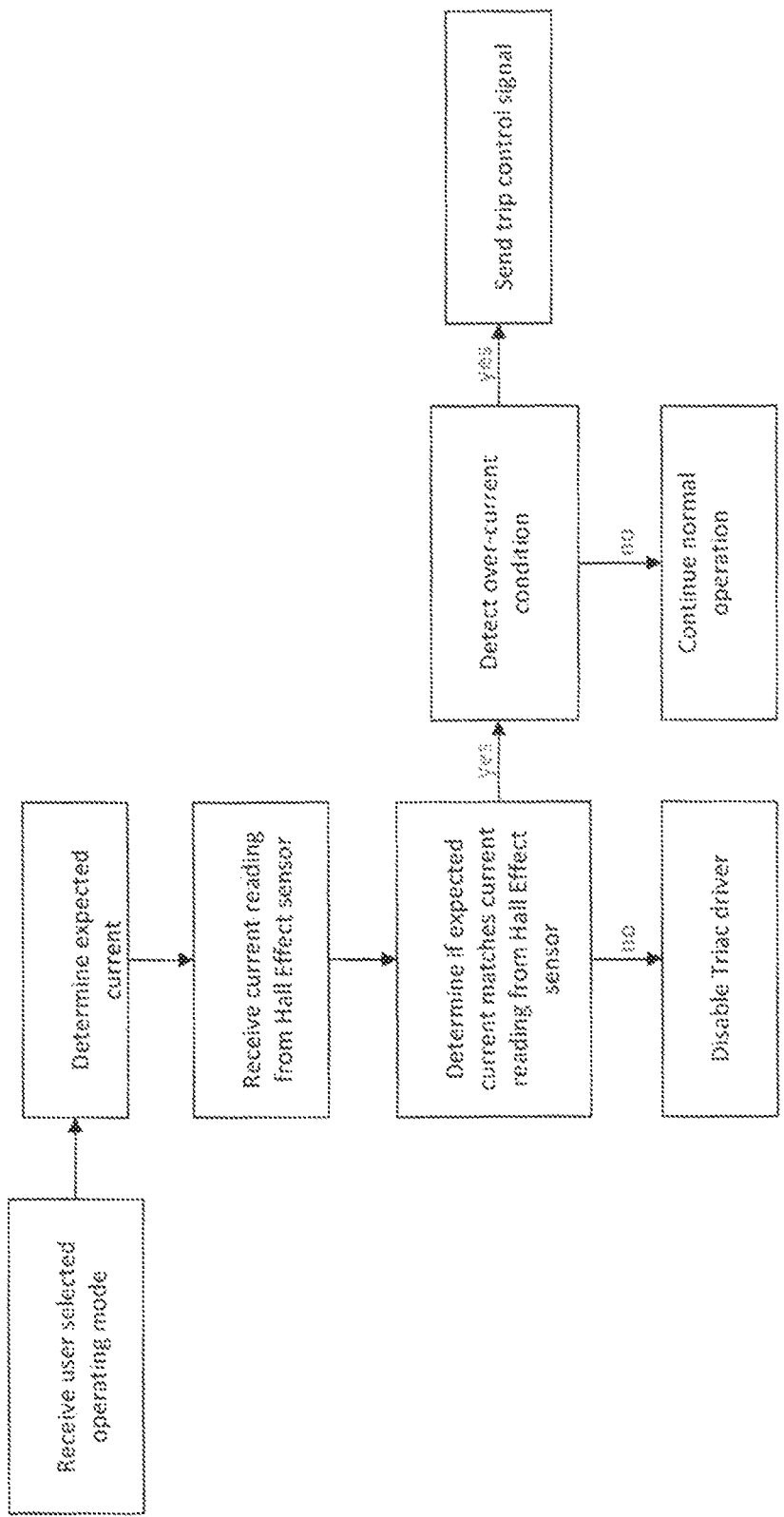
FIG. 6 is a flow chart showing a microprocessor detecting an unexpected current or overcurrent condition of the present invention.

The Hall Effect sensor 119 measures the current delivered to heating elements 103 and 104 and sends a current measurement to microprocessor 113 via a control/data line. The Hall Effect sensor 119 may be configured to measure the current through the voltage line 101, or to measure both of the two currents going to the individual heating elements 103 and 104. In either configuration, the current reading is communicated to the microprocessor 113. FIGS. 2 and 5 show a connection between microprocessor 113 and Hall Effect sensor 119. FIG. 6 shows microprocessor 113 sending a trip control signal if it detects an overcurrent condition. In FIG. 2, Hall Effect Sensor 119 is shown to measure the combined current in the power line leading to triac 108 and 109. A person of ordinary skill in the art would recognize that a possible alternative configuration would be to connect one Hall Effect sensor to the node of each triac, thereby measuring the current to each individual triac rather than the combined current.

To recognize an overcurrent condition, microprocessor 113 compares the current reading from Hall Effect Sensor 119 with a predetermined threshold current level at which the circuit may safely operate. The predetermined threshold is the threshold for an overcurrent condition. The predetermined threshold current level may be chosen based on any number of considerations, including the maximum current at which the heating element 103, 104 may operate, or the maximum current at which any of the other components in the circuit may operate. Microprocessor 113 compares the current measured by Hall Effect sensor 119 to the predetermined threshold current level. If the current exceeds the threshold, there exists a potential overcurrent condition and the flow of current should be stopped. To stop the flow of current, microprocessor 113 sends a trip control signal 505 to trip controller 118, which is connected via control/data line. Trip controller 118 responds by tripping latch relays 106 and 107, causing an open circuit with respect to the heating elements and thereby stopping the flow of current. Exemplary inputs from the Hall Effect sensor 119 to microprocessor 113, and the trip control signal 505 from microprocessor 113, are shown in FIG. 5.

In some embodiments, microprocessor 113 may additionally be configured to recognize when heating elements 103 and 104 draw a current that is within a safe range, but which is different from the current expected to be drawn given a heating element's selected operating mode. For example, a potentially dangerous scenario may occur when a heating element is set to a "LOW" temperature but drawing current reserved for a "HIGH" temperature, or vice versa. If a user has set a heating element 103 and/or 104 to a high temperature, but only a low current is being delivered, it is likely a component has failed. Possible causes of such a scenario include, without limitation, a harsh or caustic environment corroding Hall Effect sensor 119 or a failure of triacs 108, 109 or triac drivers 111, 112.

Microprocessor 113 may use a feedback loop from thermocouples 121 and 122 to deliver current to a heating element 103 and/or 104 until a desired temperature is achieved. The desired temperature may then be maintained at a steady state. A person of ordinary skill would recognize that raising the temperature of a heating element 103 or 104 draws more current than maintaining the temperature. By way of example, if a user activates electric grill 510 and selects a "HIGH" temperature, microprocessor 113 must deliver a high current to the relevant heating element 103 and/or 104 until a "HIGH" temperature has been achieved. Once microprocessor 113 recognizes that the desired "HIGH" temperature has been achieved (for example via feedback from thermocouples 121 and 122), microprocessor 113 can reduce the current delivered in order to maintain the temperature at a steady state.

Examples of how the heating elements may operate include discrete modes, such as "HIGH," "MEDIUM," "LOW," or on a continuous spectrum measured for example in % or by a temperature. Since a higher current results in a heating element having higher temperature, a person of skill in the art would recognize that raising the temperature of heating elements 103 and 104 would draw more current than maintaining a steady state temperature.

To identify an unexpected current condition, microprocessor 113 is configured to compare a current reading from Hall Effect sensor 119 with an expected current. The current which microprocessor 113 is configured to deliver to the heating elements in any given mode (accounting for whether microprocessor 113 is raising a temperature or maintaining a steady state) is the "expected current" because it is expected to match the reading from Hall Effect sensor 119 during normal operating conditions. In other words, during normal operating conditions, the current reading from Hall Effect sensor 119 is expected to match the expected current, i.e. the current microprocessor 113 is programmed to deliver. If the current reading from Hall Effect sensor 119 does not match the expected current, it is likely that a driver failure has occurred.

The expected current value may be accessible to microprocessor 113 through internal or external memory 508. In this way, microprocessor 113 is programmed to recognize the total amount of current that should be drawn by a normally-functioning heating element or elements in any given operating mode (or combinations of operating modes).

Should a failure condition arise, microprocessor 113 responds by disabling triac drivers 111 and 112, thereby opening the respective triacs and cutting current through the heating elements 103 and/or 104. In one embodiment, microprocessor 113 may optionally be programmed to re-enable the flow of current after a predetermined amount of time has passed, and to continue monitoring the current drawn. Re-enabling the flow of current may be desirable because the cause of the failure may have been temporary. By way of non-limiting example, a temporary failure condition that quickly stabilizes may be detected if the electric grill 510 was recently turned on/off, or if a temporary irregularity occurred in the power grid.

FIG. 6 is a flow chart showing microprocessor 113 determining an expected current based on the electric grill's 510 operating mode, and comparing the expected current to an actual current reading received from the Hall Effect sensor 119. If a mismatch is detected, triac drivers 111 and 112 are disabled. Moreover, FIG. 6 also shows microprocessor 113 comparing a current reading from the Hall Effect 119 sensor to an overcurrent threshold, and responding to an overcurrent condition by sending trip control signal 505. A person of ordinary skill in the art would recognize that these steps and comparisons could be performed in any order and in a number of different implementations, all of which are contemplated by the present inventions. Microprocessor 113 may repeat these operations on any desired or periodic basis.

In yet another failure example, protection circuit 100 protects against a failure of microprocessor 113. Because microprocessor 113 controls current delivered to heating elements 103 and 104, its failure could lead to unpredictable results that may include unsafe levels of current. To protect against a failure of microprocessor 113, the circuit 100 may include a watchdog monitor 120 connected between microprocessor 113 and triacs 108 and 109 as shown in FIG. 2.

In this situation, microprocessor 113 sends a watchdog monitor signal 504 to watchdog monitor 120 which confirms that microprocessor 113 is operating normally. Watchdog monitor 120 is configured to look for a signal from microprocessor 113 confirming its normal operation. Watchdog monitor 120 is also connected to triacs 108 and 109. In the absence of a signal from microprocessor 113 confirming normal operation, watchdog monitor 120 disables the triacs 108 and 109, thus preventing current from flowing to them. If microprocessor 113 subsequently returns to normal operation, watchdog monitor 120 may re-enable the flow of current. This configuration of watchdog monitor 120 allows the possibility that microprocessor 113 may return to normal operation after a period of malfunction or resetting. This is advantageous because it allows for continued operation even in scenarios where the microprocessor 113 is booting or rebooting. In other words, if the microprocessor 113 is in the process of rebooting (intentionally, or unintentionally), watchdog monitor 120 may determine that microprocessor 113 is not operating normally and disable the flow of current. But normal operation may resume once microprocessor 113 completes its boot sequence and resumes sending its signal to watchdog monitor 120.

The present inventions also provide methods for reducing the risk of unsafe electric conditions during grilling. In a preferred embodiment, a user may use an electric grill 510 to deliver current to one or more electric heating elements 103 and/or 104 which may be connected to a voltage line 101 and a neutral line 102 through triacs 108 and 109, and latch relays 106 and 107. When heating element 103 or 104 is activated by the user, a current transformer 105 in the electric grill 510's protection circuitry 100 measures a difference, if any, in the current drawn by electric grill 510 and the current returned from electric grill 510. If a current difference is detected, methods of the present inventions generate an electric signal to activate a trip controller 118 connected to a latch relay 106 and/or 107.

Methods of the present inventions may additionally include using the electric grill 510's protection circuitry 100 to measure current being delivered to a heating element 103 or 104 with a Hall Effect sensor 119 and conveying the measured current to a microprocessor 113. By activating the electric grill 510 and its protection circuitry 100, the microprocessor 113 compares the measured current to a predetermined current threshold. The predetermined current threshold may be dynamically selected based on the current operating mode selected by a user. If the measured current exceeds the predetermined threshold while the electric grill 510 is in use, the present inventions may include the step of disabling the flow of current by tripping a latch relay 106 and/or 107, or disabling a triac 108 and/or 109.

In additional embodiments, signals indicative of normal operation from the microprocessor 113 to a watchdog monitor 120 are sent. In turn, watchdog monitor 120 may enable triacs 108 and/or 109 to permit the flow of electricity to heating elements 103 and/or 104 during normal operation, and disable the flow of electricity during a phase of abnormal operation.

The devices and methods described above may be used to provide a safer electric grill experience. Various embodiments allow a user to activate a knob 501 and/or 502 (or other input means) to grill food using heat from heating elements 103 and/or 104, which in turn are controlled by a microprocessor 113. Display 503 may convey, among other things, the current temperature to the user to allow the user to decide when to put food onto a grate or how long to leave food cooking. A user may be using an electric grill 510 that has been exposed to harsh conditions for a prolonged period of time and which has electric components that may leak current. Embodiments of the invention provide a current transformer 105 which functions together with ground fault detection unit 117 and trip controller 118 to detect current leakage and, in response, trips latch relays 106 and 107. Although grilling will be halted, the user will remain safe from the leaking current. A user may respond, for example, by removing and re-installing heating elements 103, 104, and pushing a reset button 511 or similar switch. Provided the current leakage has been resolved, normal operation can continue.

During normal cooking, a heating element 103, 104 or other component may become unintentionally loose, or may be damaged from heat or other environmental factors. A possible result is that electric grill 510 may draw an unsafe current, which is detected by microprocessor 113 via a signal from Hall Effect sensor 119. The microprocessor 113 may respond by activating a trip controller 119 and thereby opening latches 106 and 107. As described above, the result is a stoppage of current and the user may attempt to restart the electric grill 510 via reset button 511.

Similarly, an unsafe condition may lead heater 103 and/or 104 to draw an amount of current that differs from the amount expected based on the user settings of knobs 501 and/or 502. In response, embodiments of the invention provide a microprocessor 113 which may disable triacs 108/109 (via their drivers) to stop the flow of current. A user may be alerted via display 503, but latches 106 and 107 are not tripped in this case, so in this instance, the user may not have to reset the button 511.

Further, embodiments of the invention may include a watchdog monitor 120 which may be provided to monitor the correct operation of microprocessor 113 while electric grill 510 is in use by a user. Watchdog monitor 120 may disable triacs 108/109 if microprocessor 113 enters an abnormal operating state, including a possible reboot. A user does not have to reset the button 511 and may wait for microprocessor 113 to return to normal operation to resume grilling.

The hardware and specifically configured microprocessor may be provided to a user to ensure a safe grilling experience. A person of skill in the art would recognize that electric grills having various combinations of the embodiments described above are possible, and not every feature must necessarily be included in each embodiment. Moreover, although the present inventions have particular applicability to grills for outdoor use, it will be understood by those of skill in the art that the present inventions may be used on a variety of grills or other devices, whether for indoor or outdoor use.

The above description is not intended to limit the meaning of the words used in or the scope of the following claims that define the invention. Rather the descriptions and illustrations have been provided to aid in understanding the various embodiments. It is contemplated that future modifications in structure, function or result will exist that are not substantial changes and that all such insubstantial changes in what is claims are intended to covered by the claims. Thus, while preferred embodiments of the present inventions have been illustrated and described, one of skill in the art will understand that numerous changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. An electric grill, comprising:
   a heating element connected to a voltage line through a triac, and further connected to a neutral line;
   a knob for selecting an operating mode of the heating element;
   a trip controller in communication with a latch, the latch being connected between the heating element and the voltage line;
   a current sensor for measuring current delivered to the heating element;
   a memory;
   a display to present the selected operating mode of the heating element; and
   a microprocessor in operable communication with the knob, the trip controller, and the current sensor, wherein the microprocessor is to:
   receive a current measurement from the current sensor;
   access the memory to receive an expected current associated with the selected operating mode;
   select a current threshold based on the expected current associated with the selected operating mode, the current threshold being less than the expected current;
   cause the trip controller to disable the latch in response to the current reading from the current sensor being less than the current threshold; and
   cause, in response to the disabling of the latch, the display to present an alert to indicate that the latch has been disabled.

2. The electric grill of claim 1, wherein the selected operating mode is a high, medium, or low operating mode of the heating element, and wherein the memory includes an expected current associated with the high, medium, or low operating mode.

3. The electric grill of claim 1, wherein the current sensor is a Hall effect sensor.

4. The electric grill of claim 1, wherein the selected operating mode is indicative of a desired target temperature, and wherein the microprocessor is further to use a feedback loop from a thermocouple positioned proximate the heating element to deliver current to the heating element until the desired target temperature is achieved.

5. The electric grill of claim 1, further including a current transformer in operable communication with the trip controller, the current transformer to disable the latch in response to measuring a current difference between the voltage line and the neutral line.

6. An electric circuit for operating and protecting an electric grill, comprising:
   a heating element in communication with a user input device for selecting a high, medium, or low operating mode of the heating element;
   a display to display the selected operating mode;
   a latch to disable the flow of current to the heating element;
   a current sensor to measure a current delivered to the heating element; and
   a microprocessor connected to a triac, the triac connected between a voltage line and the heating element such that the microprocessor is to control the heating element by activating the triac;
   wherein the microprocessor is further to:
      receive the measured current from the current sensor;
      access the selected high, medium, or low operating mode from the user input device;
      retrieve an expected current associated with the selected high, medium, or low operating mode from a memory;
      select a current threshold based on the expected current associated with the selected high, medium, or low operating mode, the current threshold being less than the expected current;
      cause the latch to become disabled in response to the measured current being less than the current threshold; and
      cause, in response to the current being less than the current threshold, the display to present an alert to indicate that the heating element has been disabled.

7. The electric circuit of claim 6, wherein the alert is to prompt a user to reset a switch.

8. The electric circuit of claim 6, further including a current transformer to:
   measure a current difference between the voltage line and a neutral line; and
   disable the flow of current to the heating element in response to detecting the current difference.

9. The electric circuit of claim 6, wherein the current sensor is a Hall effect sensor.

10. The electric circuit of claim 6, further including a watchdog monitor to:
    receive a periodic signal from the microprocessor; and
    disable the latch in response to an absence of the periodic signal.

11. An electric grill, comprising:
    a housing having one or more user inputs for selecting a high, medium, or low operating mode of a heating element, and a display to display the selected operating mode;
    an electric cord connected to a voltage line and a neutral line, the heating element being connected to a triac and further connected to the voltage line and neutral line;
    at least one latch relay connected between the heating element and the voltage line, the latch relay to selectively disable a flow of current to the heating element;
    a microprocessor connected to a triac driver, the triac driver being in communication with the triac, wherein the microprocessor is to activate the triac driver to deliver a current associated with the selected operating mode; and
    a current sensor to measure current passing through the triac, the current sensor to provide a measured current to the microprocessor; and
    wherein the microprocessor is further to:
       access the measured current from the current sensor;
       access a memory to retrieve an expected current threshold associated with the selected high, medium, or low operating mode of the heating element, the expected current threshold being less than an expected current associated with the selected high, medium, or low operating mode of the heating element;
       compare the measured current with the expected current threshold for the selected high, medium, or low operating mode;
       disable the flow of current to the heating element in response to a measured current that is less than the expected current threshold; and
       cause the display to present an alert, the alert to indicate that the flow of current has been disabled.

12. The electric grill of claim 11, further including a watchdog monitor in operable communication with the microprocessor, the watchdog monitor to:
    receive a signal indicative of normal operation from the microprocessor; and
    disable the flow of current to the heating element in the absence of such a signal.

13. The electric grill of claim 11, further including a second heating element, and a second user input for selecting a second operating mode of the second heating element.

14. The electric grill of claim 13, wherein the microprocessor is further to access the memory to retrieve a second expected current threshold associated with the second selected operating mode.

15. The electric grill of claim 14, further including a second current sensor in communication with the microprocessor, the second current sensor to:
    measure the current delivered to the second heating element; and
    communicate a second measured current to the microprocessor.

16. The electric grill of claim 15, wherein the microprocessor is further to:
    compare the second measured current to the second expected current threshold; and
    disable the flow of current to the second heating element in response to a second measured current that is lower than the second expected current.

* * * * *